(12) United States Patent
Christensen

(10) Patent No.: US 12,332,663 B2
(45) Date of Patent: Jun. 17, 2025

(54) LIGHT EMITTING DEVICE POSITIONAL TRACKING FOR MOBILE PLATFORMS

(71) Applicant: FLIR Unmanned Aerial Systems AS, Hvalstad (NO)

(72) Inventor: Matias Varnum Christensen, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 334 days.

(21) Appl. No.: 17/847,709

(22) Filed: Jun. 23, 2022

(65) Prior Publication Data
US 2022/0413519 A1 Dec. 29, 2022

Related U.S. Application Data

(60) Provisional application No. 63/215,893, filed on Jun. 28, 2021.

(51) Int. Cl.
| | |
|---|---|
| *B64U 70/95* | (2023.01) |
| *G05D 1/00* | (2024.01) |
| *G05D 1/654* | (2024.01) |
| *G06T 7/246* | (2017.01) |
| *G06T 7/277* | (2017.01) |
| *G06T 7/70* | (2017.01) |
| *G06T 7/73* | (2017.01) |

(52) U.S. Cl.
CPC .............. *G05D 1/12* (2013.01); *B64U 70/95* (2023.01); *G05D 1/0676* (2013.01); *G05D 1/101* (2013.01); *G05D 1/654* (2024.01); *G06T 7/70* (2017.01); *G06T 2207/10032* (2013.01)

(58) Field of Classification Search
CPC ........ G05D 1/12; G05D 1/654; G05D 1/0676; G05D 1/101; G06T 7/70; G06T 2207/10032; B64U 70/95
USPC ......................................................... 382/103
See application file for complete search history.

(56) References Cited

U.S. PATENT DOCUMENTS 10,532,277 B2    1/2020   Higgins et al.

FOREIGN PATENT DOCUMENTS

| JP | 2020144576 A | * | 9/2020 | |
| WO | WO-2021124524 A1 | * | 6/2021 | ........... G08B 13/191 |

OTHER PUBLICATIONS

Smith, Steven W., "The Scientist and Engineer's Guide to Digital Signal Processing", California Technical Publishing, Jan. 1997, pp. 486-488.*

(Continued)

*Primary Examiner* — Chineyere Wills-Burns
*Assistant Examiner* — Lucius Cameron Green Allen
(74) *Attorney, Agent, or Firm* — Haynes and Boone, LLP

(57) ABSTRACT

Light emitting device positional tracking systems and methods are provided. In one example, a method includes receiving images captured of a target location comprising a plurality of light emitting devices, where each of the light emitting devices has an associated blinking pattern. The method may further include detecting the blinking pattern for each of the light emitting devices in the images. The method may further include determining a classification for each of the light emitting devices based on its detected blinking pattern. The method may further include aligning a mobile platform with the target location based on the classifications of the light emitting devices. Related devices and systems are also provided.

20 Claims, 8 Drawing Sheets

(56) References Cited

OTHER PUBLICATIONS

K. Dividis, "Design and Prototyping of a Visible Light Indoor Positioning System", Philips Research, Eindhoven, Netherlands, Feb. 2007 (Year: 2007).*

W. Rurik and A. Mazumdar, "Hamming codes as error-reducing codes," 2016 IEEE Information Theory Workshop (ITW), Cambridge, UK, 2016, pp. 404-408 (Year: 2016).*

Marcin Skoczylas, Łukasz Gadomer, Wojciech Walendziuk, Maciej Słowik, "Autonomic drone landing system based on LEDs pattern and visual markers recognition," Proc. SPIE 10808, Photonics Applications in Astronomy, Communications, Industry, and High-Energy Physics Experiments 2018, Oct. 2018 (Year: 2018).*

B. Purahong, T. Anuwongpinit and J. Dumrong, "Identity checking system by visible light," The 4th Joint International Conference on Information and Communication Technology, Electronic and Electrical Engineering (JICTEE), Chiang Rai, Thailand, 2014, pp. 1-5, doi: 10.1109/JICTEE.2014.6804109. (Year: 2014).*

Smith, Steven W., "The Scientist and Engineer's Guide to Digital Signal Processing", California Technical Publishing, Jan. 1997, pp. 486-488 (Year: 1997).*

Steven C. Nothelfer and S. Franconeri, "Measures of the Benefit of Direct Encoding of Data Deltas for Data Pair Relation Perception," in IEEE Transactions on Visualization and Computer Graphics, vol. 26, No. 1, pp. 311-320, Jan. 2020 (Year: 2020).*

Goeller, Laurin, "Drone Precision Landing using Computer Vision" Jun. 24, 2018, Distributed Computing Group, Computer Engineering and Networks Laboratory, ETH Zürich.

Galimov, Musa et al., "UAV Positioning Mechanisms in Landing Stations: Classification and Engineering Design Review;" Jun. 29, 2020, Sensors (Basel).

\* cited by examiner

LIGHT EMITTING DEVICE POSITIONAL TRACKING FOR MOBILE PLATFORMS

CROSS REFERENCE TO RELATED APPLICATIONS

This application claims priority to and the benefit of U.S. Provisional Patent Application No. 63/215,893 filed Jun. 28, 2021 and entitled "LIGHT EMITTING DEVICE POSITIONAL TRACKING FOR MOBILE PLATFORMS," which is incorporated herein by reference in its entirety.

TECHNICAL FIELD

The present invention relates generally to mobile platforms and, more particularly, to light emitting device positional tracking systems and methods for mobile platforms.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and others. In many cases, a UAV may be equipped with a variety of different elements, such as different types of sensors and navigation devices, and may be configured to address a broad variety of operational needs. In conducting various missions, a UAV may have to land and take-off. Landing and take-off for UAVs, especially autonomous UAVs, requires accurate positioning between the UAV and the landing location. Even more accurate positioning may be required when the UAV needs to be aligned with a target location to be docked for charging, data transfer, or movement into storage. There exists a need for robust and highly accurate tracking techniques capable of achieving sub-millimeter precision.

SUMMARY

In one or more embodiments, a method includes receiving images captured of a target location that has associated therewith a plurality of light emitting devices. Each of the light emitting devices may have an associated blinking pattern. The method may further include detecting the blinking pattern for each of the light emitting devices in the images. The method may further include determining a classification for each of the light emitting devices based on its detected blinking pattern. The method may further include aligning a mobile platform with the target location based on the classifications of the light emitting devices.

In one or more embodiments, a system includes a logic device configured to receive images captured of a target location comprising a plurality of light emitting devices, where each of the light emitting devices has an associated blinking pattern. The logic device may further be configured to detect the blinking pattern for each of the light emitting devices in the images. The logic device may further be configured to determine a classification for each of the light emitting devices based on its detected blinking pattern. The logic device may further be configured to align a mobile platform with the target location based on the classifications of the light emitting devices.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
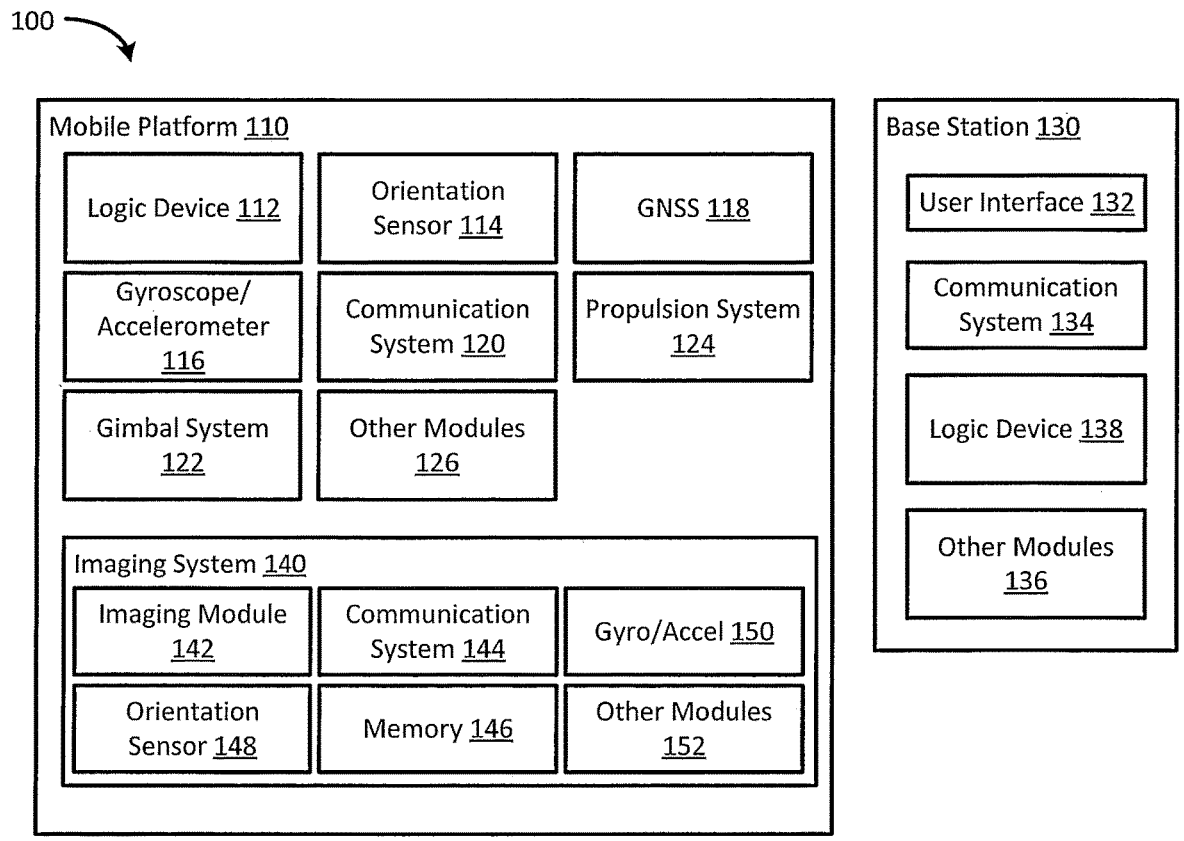
FIG. 1 illustrates a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are provided for facilitating light emitting device positional tracking for mobile platforms such as UAVs. For example, a UAV may use its camera to capture images of a set of light emitting devices (e.g., light emitting diode (LED) lights) emitting variable intensities in order to land and/or dock at a target location such as a stationary landing platform or a moving landing platform. The set of light emitting devices located at the target location may have associated blinking patterns that are unique from each other. The UAV may capture the emitted intensities from the light emitting devices over multiple camera frames in order to identify the light emitting devices based on their blinking patterns. In various embodiments, the light emitting devices may emit visible light, infrared light, or any other wavelength as long as they are detectable by the camera of the UAV. While reference is primarily made herein to embodiments in which a camera is disposed on a UAV and light emitting devices are disposed at the target location, further embodiments are contemplated wherein a camera is disposed at the target location and the light emitting devices are disposed on the UAV.

In one example embodiment, a method, performed by a logic device (e.g., a logic device disposed on a UAV or a base station in communication with the UAV), may include receiving images captured of a target location that has a plurality of light emitting devices, each with an associated blinking pattern. For each frame, possible light emitting devices in the frame are detected. A detected point from each frame may be tracked across frames through an optimization algorithm, which may include minimizing a difference between a parameterized mathematical model of a light emitting device (e.g., a logistic blob function) and the observed point in the image frame until convergence is reached. If a final error in the optimization is sufficiently small, the point may be considered successfully tracked, otherwise the point may be discarded.

For all of the points that are successfully tracked, the method may include storing their apparent radius as it changes from frame to frame. The stored radiuses may allow a radius gradient history over time to be determined. The method may include reconstructing a blinking pattern of a light emitting device by analyzing the radius gradient history. Once a tracked point blinks in a pattern that is recognized, the tracked point is considered to have been observed and an observation number associated with that tracked point may increase. For example, the logic device may recognize the blinking pattern based on access it has to stored possible blinking patterns corresponding to light emitting devices at the target location and to which it may compare the reconstructed blinking pattern from the radius gradient history analysis. Once a tracked point has been observed a sufficient number of times (e.g., number of observations meets or exceeds a threshold), the tracked point may be classified as observed (e.g., the tracked point is classified as a known light emitting device associated with the target location).

Once a sufficient number of tracked points have been classified as observed light emitting devices, the method may include determining a pose of the camera of the UAV in relation to the light emitting devices and aligning the UAV with the target location for one or more actions such as landing or docking. Further embodiments and details are described below in reference to the accompanying figures of the disclosure.

FIG. 1 illustrates a block diagram of a survey system 100 including a mobile platform 110 in accordance with one or more embodiments of the present disclosure. In various embodiments, the survey system 100 and/or elements of the survey system 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, mobile platform 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the mobile platform 110 and/or the sensor payload 140, as described herein, such as controlling the gimbal system 122 to aim the sensor payload 140 towards a particular direction, and/or controlling a propulsion system 124 to move the mobile platform 110 to a desired position in a scene or structure or relative to a target. In some cases, the imagery and/or sensor data may be used to detect light emitting devices associated with a target location and, in turn, land the mobile platform 110 at the target location or align the mobile platform 110 to interact with the target location.

In the embodiment shown in FIG. 1, the survey system 100 includes the mobile platform 110, base station 130, and at least one imaging system/sensor payload 140. The mobile platform 110 may be implemented as a mobile platform configured to move or fly and position and/or aim the sensor payload 140 (e.g., relative to a designated or detected target). As shown in FIG. 1, the mobile platform 110 may include one or more of a logic device 112, an orientation sensor 114, a gyroscope/accelerometer 116, a global navigation satellite system (GNSS) 118, a communication system 120, a gimbal system 122, a propulsion system 124, and other modules 126. Operation of the mobile platform 110 may be substantially autonomous and/or partially or completely controlled by the base station 130, which may include one or more of a user interface 132, a communications module 134, a logic device 138, and other modules 136. In other embodiments, the mobile platform 110 may include one or more of the elements of the base station 130, such as with various types of manned aircraft, terrestrial vehicles, and/or surface or subsurface watercraft. The sensor payload 140 may be physically coupled to the mobile platform 110 and be configured to capture sensor data (e.g., visible spectrum images, infrared images, narrow aperture radar data, and/or other sensor data) of a target position, area, and/or object(s) as selected and/or framed by operation of the mobile platform 110 and/or the base station 130. In some embodiments, one or more of the elements of the survey system 100 may be implemented in a combined housing or structure that can be coupled to or within the mobile platform 110 and/or held or carried by a user of the survey system 100.

The logic device 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the mobile platform 110 and/or other elements of the survey system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the logic device 112. In these and other embodiments, the logic device 112 may be implemented with other components where appropriate, such as volatile memory, non-volatile memory, one or more interfaces, and/or various analog and/or digital components for interfacing with devices of the survey system 100. For example, the logic device 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the logic device 112 may be integrated with one or more other elements of the mobile platform 110, for example, or distributed as multiple logic devices within the mobile platform 110, base station 130, and/or sensor payload 140.

In some embodiments, the logic device 112 may be configured to substantially continuously monitor and/or store the status of and/or sensor data provided by one or more elements of the mobile platform 110, sensor payload 140, and/or base station 130, such as the position and/or orientation of the mobile platform 110, sensor payload 140, and/or base station 130, for example. In various embodiments, sensor data may be monitored and/or stored by the logic device 112 and/or processed or transmitted between elements of the survey system 100 substantially continuously throughout operation of the survey system 100, where such data includes various types of sensor data (e.g., for blinking pattern detection), control parameters, and/or other data.

The orientation sensor 114 may be implemented as one or more of a compass, float, accelerometer, and/or other device capable of measuring an orientation of the mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the survey system 100. In some cases, a yaw and/or position of the mobile platform 110 may be adjusted to better position/orient the mobile platform 110 to align with a target location based on detected blinking patterns of light emitting devices associated with the target location. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the mobile platform 110 and/or other elements of the survey system 100 and providing such measurements as sensor signals and/or data that may be communicated to other devices of the survey system 100 (e.g., user interface 132, logic device 112, logic device 138). The GNSS 118 may be implemented according to any global navigation satellite system, including a GPS, GLONASS, and/or Galileo based receiver and/or other device capable of determining absolute and/or relative position of the mobile platform 110 (e.g., or an element of the mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communication system 120 may be implemented as any wired and/or wireless communications module configured to transmit and receive analog and/or digital signals between elements of the survey system 100. For example, the communication system 120 may be configured to receive flight control signals and/or data from the base station 130 and provide them to the logic device 112 and/or propulsion system 124. In other embodiments, the communication system 120 may be configured to receive images and/or other sensor information (e.g., visible spectrum and/or infrared still images or video images) from the sensor payload 140 and relay the sensor data to the logic device 112 and/or base station 130. In some embodiments, the communication system 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication system 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the logic device 112 to stabilize the sensor payload 140 relative to a target (e.g., a target location) or to aim the sensor payload 140 or components coupled thereto according to a desired direction and/or relative orientation or position. As such, the gimbal system 122 may be configured to provide a relative orientation of the sensor payload 140 (e.g., relative to an orientation of the mobile platform 110) to the logic device 112 and/or communication system 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140 ±90 degrees, or up to 360 degrees, in a vertical plane relative to an orientation and/or position of the mobile platform 110. In further embodiments, the gimbal system 122 may rotate the sensor payload 140 to be parallel to a longitudinal axis or a lateral axis of the mobile platform 110 as the mobile platform 110 yaws, which may provide 360 degree ranging and/or imaging in a horizontal plane relative to mobile platform 110. In various embodiments, logic device 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the mobile platform 110 and/or to steer the mobile platform 110. In some embodiments, the propulsion system 124 may include multiple propellers (e.g., a tri, quad, hex, oct, or other type "copter") that can be controlled (e.g., by the logic device 112 and/or the logic device 138) to provide lift and motion for the mobile platform 110 and to provide an orientation for mobile platform 110. In other embodiments, the propulsion system 124 may be configured primarily to provide thrust while other structures of the mobile platform 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of the mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., logic device 112) to provide operational control of the mobile platform 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the mobile platform 110, where each actuated device includes one or more actuators adapted to adjust an orientation of the device, relative to the mobile platform 110, in response to one or more control signals (e.g., provided by the logic device 112). In particular, other modules 126 may include a stereo vision system configured to provide image data that may be used to calculate or estimate a position of the mobile platform 110, for example, or to calculate or estimate a relative position of a navigational hazard in proximity to the mobile platform 110. In various embodiments, the logic device 112 may be configured to use such proximity and/or position information to help safely pilot the mobile platform 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communication system 134 of the base station 130) to other devices of the survey system 100, such as the logic device 112. The user interface 132 may also be implemented with logic device 138 (e.g. similar to logic device 112), which may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, and/or other information), for example, or to perform various other processes and/or methods described herein (e.g., via logic device 138).

In one embodiment, the user interface 132 may be adapted to display a time series of various sensor information and/or other parameters as part of or overlaid on a graph or map, which may be referenced to a position and/or orientation of the mobile platform 110 and/or other elements of the survey system 100. For example, the user interface 132 may be adapted to display a time series of positions, headings, and/or orientations of the mobile platform 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the mobile platform 110 to move according to the target heading, route, and/or orientation, or to aim the sensor payload 140 accordingly. In other embodiments, the user interface 132 may be adapted to accept user input modifying a control loop parameter of the logic device 112, for example. In further embodiments, the user interface 132 may be adapted to accept user input including a user-defined target attitude, orientation, and/or position for an actuated or articulated device (e.g., the sensor payload 140) associated with the mobile platform 110, for example, and to generate control signals for adjusting an orientation and/or position of the actuated device according to the target altitude, orientation, and/or position. Such control signals may be transmitted to the logic device 112 (e.g., using the communication system 134 and 120), which may then control the mobile platform 110 accordingly.

The communication system 134 may be implemented as any wired and/or wireless communications module configured to transmit and receive analog and/or digital signals between elements of the survey system 100. For example, the communication system 134 may be configured to transmit flight control signals from the user interface 132 to communication system 120 or 144. In other embodiments, the communication system 134 may be configured to receive sensor data (e.g., visible spectrum and/or infrared still images or video images, or other sensor data) from the sensor payload 140. In some embodiments, the communication system 134 may be configured to support spread spectrum transmissions, for example, and/or multiple simultaneous communications channels between elements of the survey system 100. In various embodiments, the communication system 134 may be configured to monitor the status of a communication link established between the base station 130, the sensor payload 140, and/or the mobile platform 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., logic device 112) to provide operational control of the mobile platform 110 and/or survey system 100 or to process sensor data to compensate for environmental conditions, such as an water content in the atmosphere approximately at the same altitude and/or within the same area as the mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the logic device 112) that can be configured to process imagery captured by detector elements of the imaging module 142 before providing the imagery to memory 146 or the communication system 144. More generally, the imaging module 142 may be configured to perform any of the operations or methods described herein, at least in part, or in combination with the logic device 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 144 of the sensor payload 140 may be implemented as any wired and/or wireless communications module configured to transmit and receive analog and/or digital signals between elements of the survey system 100. For example, the communication system 144 may be configured to transmit infrared images from the imaging module 142 to communication system 120 or 134. In other embodiments, the communication system 144 may be configured to receive control signals (e.g., control signals directing capture, focus, selective filtering, and/or other operation of sensor payload 140) from the logic device 112 and/or user interface 132. In some embodiments, communication system 144 may be configured to support spread spectrum transmissions, for example, and/or multiple simultaneous communications channels between elements of the survey system 100. In various embodiments, the communication system 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the mobile platform 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., logic device 112) to provide operational control of the mobile platform 110 and/or survey system 100 or to process imagery to compensate for environmental conditions.

In general, each of the elements of the survey system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the mobile platform 110, using one or more power leads. Such power leads may also be used to support one or more communication techniques between elements of the survey system 100.

Figure 2:
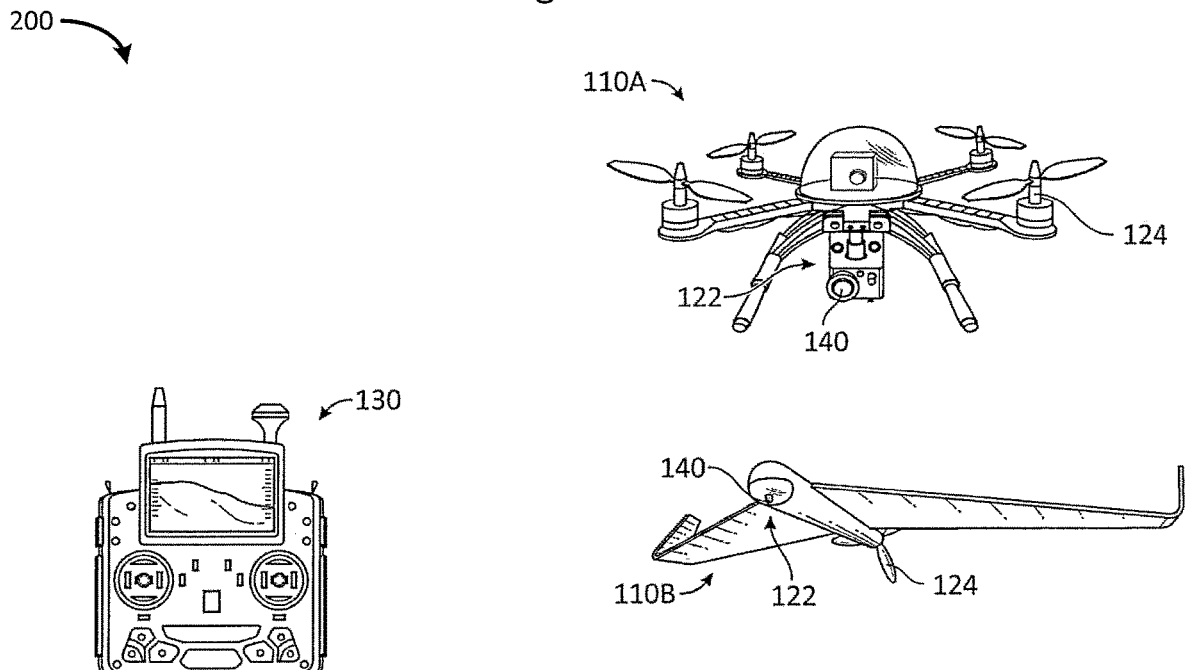
FIG. 2 illustrates a diagram of a survey system in accordance with one or more embodiments of the present disclosure.

FIG. 2 illustrates a diagram of a survey system 200 including mobile platforms 110A and 110B, each with sensor payloads 140 and associated gimbal systems 122 in accordance with one or more embodiments of the present disclosure. In the embodiment shown in FIG. 2, the survey system 200 includes a base station 130, mobile platform 110A with articulated imaging system/sensor payload 140 and gimbal system 122, and mobile platform 110B with articulated imaging system/sensor payload 140 and gimbal system 122, where the base station 130 may be configured to control motion, position, and/or orientation of the mobile platform 110A, mobile platform 110B, and/or sensor payloads 140. More generally, the survey system 200 may include any number of the mobile platforms 110, 110A, and/or 110B.

Figure 3:
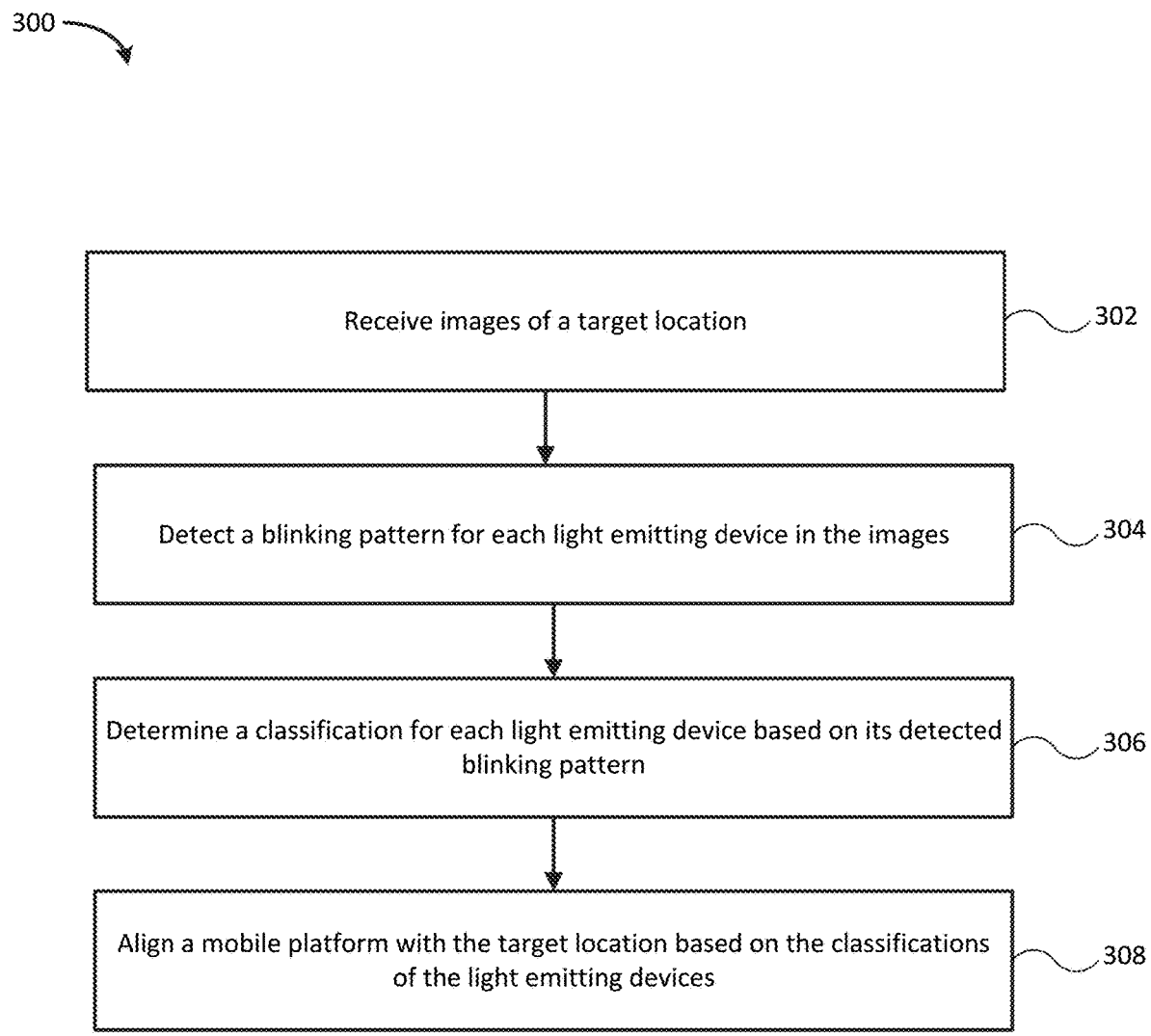
FIG. 3 illustrates a flow diagram of a process for light emitting device positional tracking in accordance with one or more embodiments of the present disclosure.
Figure 4:
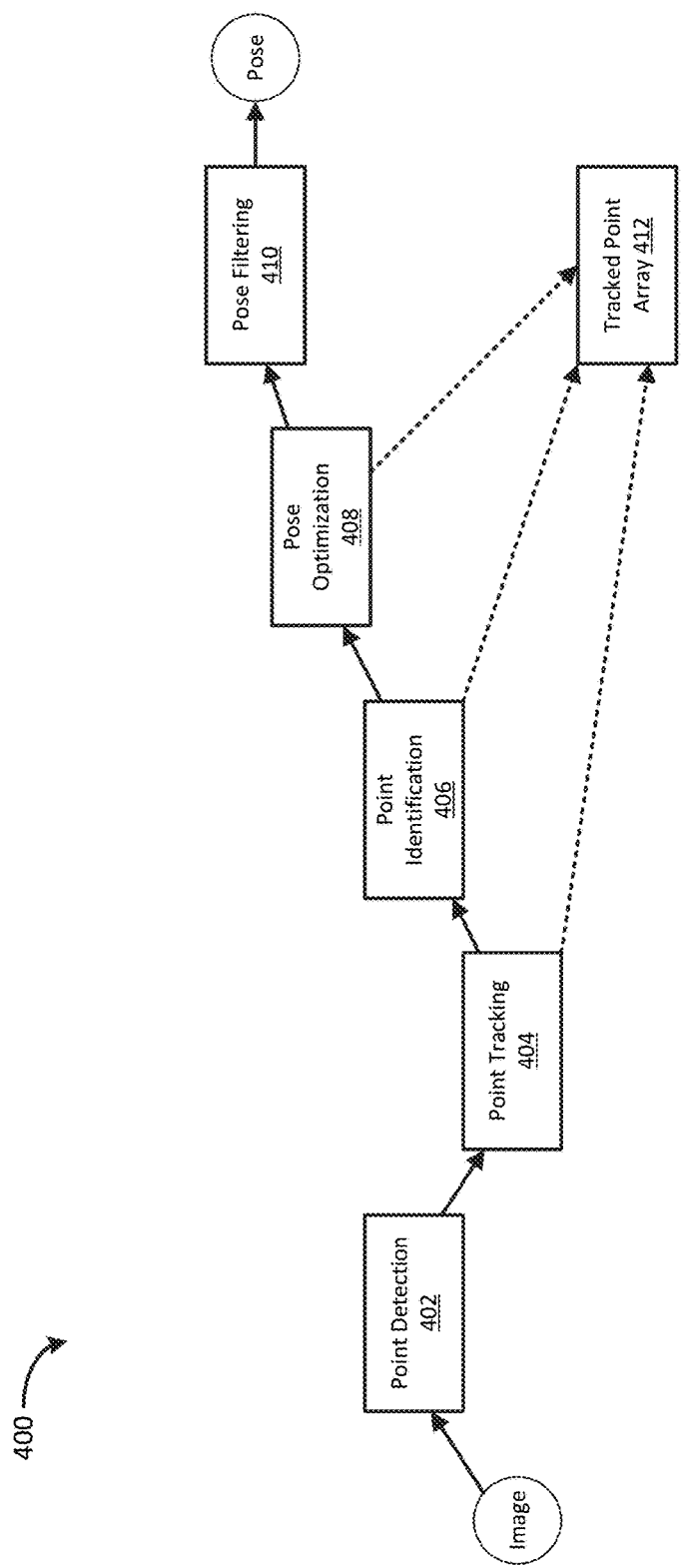
FIG. 4 illustrates a pipeline for determining a camera pose based on a received image in accordance with one or more embodiments of the present disclosure.
Figure 5:
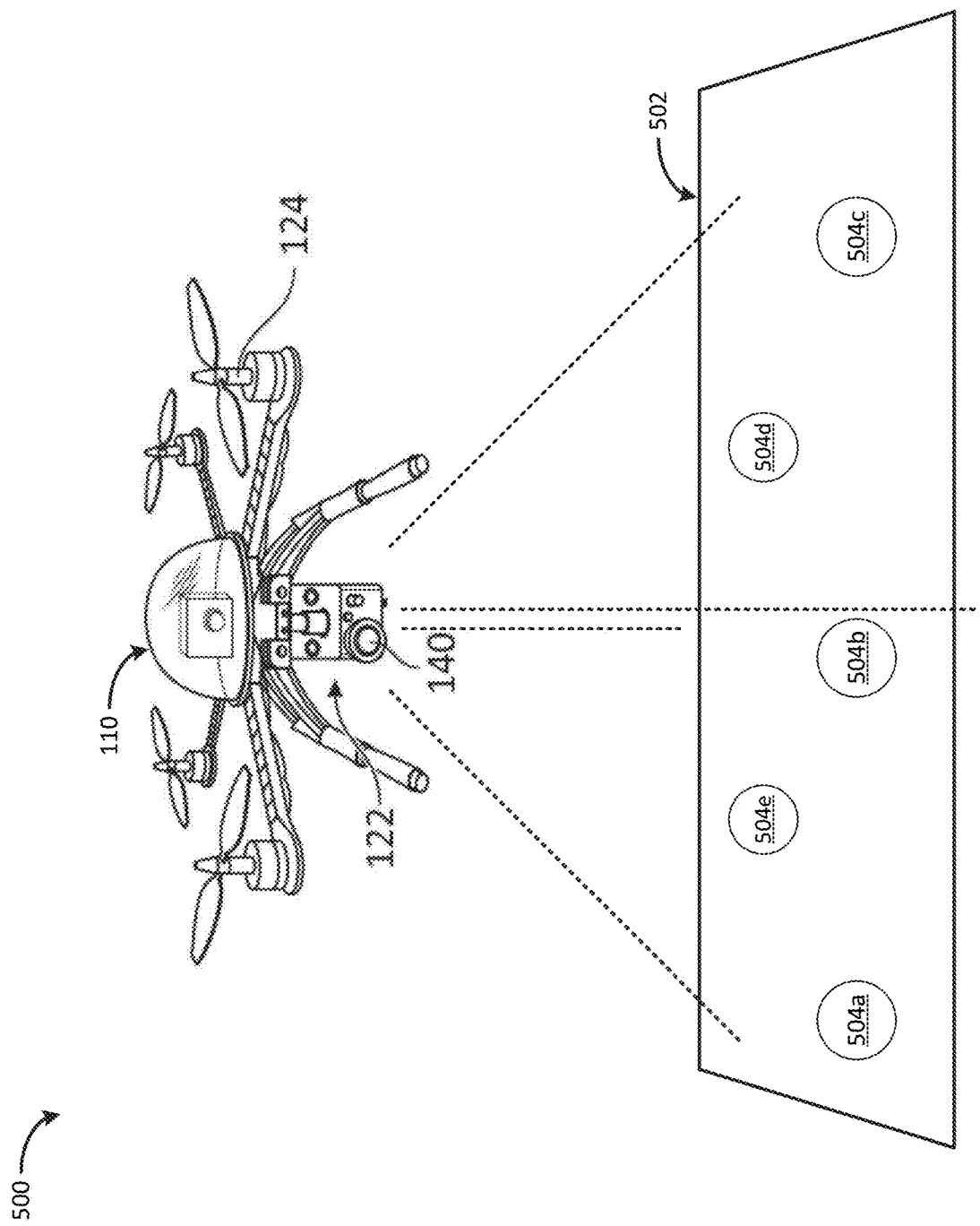
FIG. 5 illustrates an example environment in which a mobile platform aligns with a target location in accordance with one or more embodiments of the present disclosure.
Figure 6A:
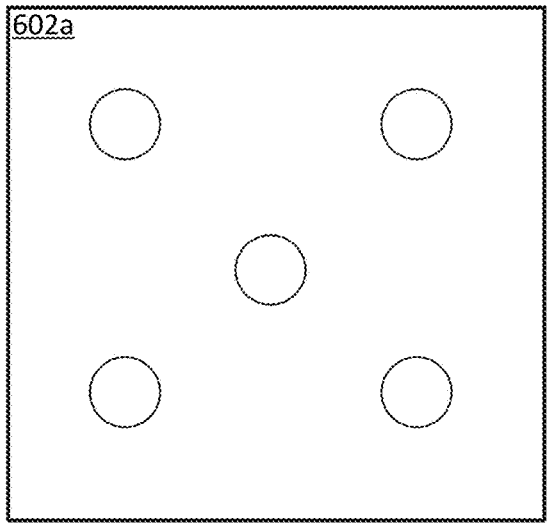
FIGS. 6A-6D each illustrate an example light emitting device configuration associated with a target location in accordance with embodiments of the present disclosure.
Figure 6B:
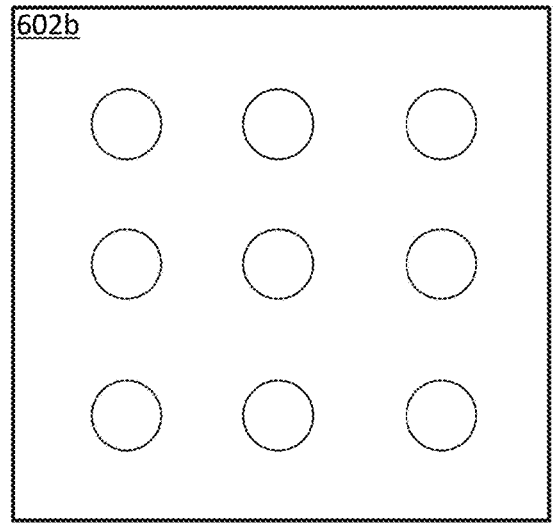
Figure 6C:
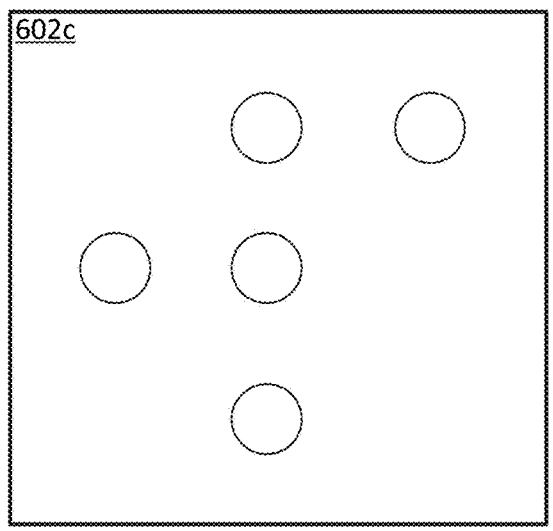
Figure 6D:
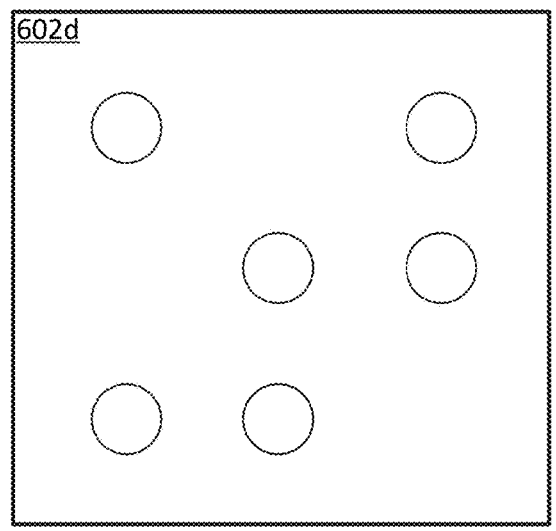

FIG. 3 illustrates a flow diagram of an example process 300 for facilitating light emitting device positional tracking in accordance with one or more embodiments of the present disclosure. For explanatory purposes, the process 300 is described with reference to FIGS. 1, 2, and 4-9. Note that one or more operations in FIG. 3 may be combined, omitted, and/or performed in a different order as desired. According to various embodiments, the process 300 may be performed by a logic device (e.g., logic device 112 or logic device 138) implemented to execute an algorithm split into a pipeline 400 of modules 402-410 as shown in FIG. 4, where the final module outputs a Gaussian over the SE(3) pose of a camera (e.g., imaging module 142) of the mobile platform 110. By separating the algorithm into a series of modules 402-410, the problem of aligning a mobile platform with a target location can be divided into smaller and more manageable pieces. This split approach may make it easier to alter or even replace a module while not affecting other modules in the pipeline 400 according to various embodiments.

At block 302 of FIG. 3, the logic device may receive images captured of a target location that includes a plurality of light emitting devices, where each of the plurality of light emitting devices may have an associated blinking pattern. For example, referring to FIG. 5, the logic device may receive captured images from the imaging system 140 of the mobile platform 110. The mobile platform 110 (e.g., imaging system 140) operating in an environment 500 may capture images of a target location 502, which includes a plurality of light emitting devices 504a-504e. In some cases, imaging system 140 may capture images of the target location 502 from certain distances away as the mobile platform 110 approaches the target location 502. The logic device may communicate with imaging system 140 to capture the images according to some embodiments, and the images may be sent to and received by the logic device for further image processing at block 302.

In some embodiments, the target location 502 may be a landing platform where the mobile platform 110 may be parked for movement into storage. In some embodiments, the target location 502 may be a location where the mobile platform may be docked for power (e.g., battery charging) or data transfer. In such cases, the mobile platform 110 may need to be precisely aligned with the target location 502 such that a wired or wireless interface may connect the mobile platform 110 to an electronic system associated with the target location 502. The electronic system associated with the target location 502 may be configured to provide power to the mobile platform 110 and/or transfer data to and from the mobile platform 110.

FIGS. 6A-6D illustrate example target locations 602a-602d which include a plurality of light emitting devices arranged in various configurations according to one or more embodiments of the disclosure. Each light emitting device may have its own associated blinking pattern independent from the other light emitting devices. In some embodiments, to provide a blinking pattern, a light emitting device may emit pulse-width-modulated (PWM) signals where such emitted signals may be adjusted to provide different intensity levels in an associated blinking pattern by, for example, adjusting a duty cycle. In some cases where there are power and/or thermal constraints, each light emitting devices may operate to provide a respective blinking pattern using various PWM signals corresponding to intensity levels in the blinking pattern which do not damage the light emitting devices and/or other components (e.g., components close to the light emitting devices and/or having low thermal tolerance), such as due to excessive power draw and/or high temperatures. A blinking pattern for a light emitting device may have a minimum intensity level in the pattern that is visible to an image sensor (e.g., camera, imaging module 142) of imaging system 140 while not being too bright as to cause eye damage to a pilot and/or others. The duty cycle (e.g., and thus resulting intensity) may be automatically modified to provide the associated blinking pattern of a light emitting device.

Referring again to FIG. 5, the logic device may track both a position and intensity of the light emitting devices 504a-504e over the received images of the target location 502 to help identify and classify the light emitting devices 504a-e according to various embodiments discussed herein at latter blocks of process 300. In an embodiment, the logic device may implement a tracked point array 412, as shown in FIG. 4, which may be a shared data structure used by the point tracking module 402, the point identification module 404, and the pose optimization module 406 in pipeline 400 to keep track of points in received images to later be identified as light emitting devices 504a-504e. Each tracked point struct may represent a single point. The array of points may be pre-allocated and disabled points may be reused in detecting/tracking new points. Each point may be in one of four states. A disabled state may indicate that the point is not currently detected/tracked and may be used for a newly detected point. An infant state may indicate that the point has just been created this frame (e.g., detected in the current frame). An immature state may indicate that a point has been tracked over at least two frames, but not enough frames to identify its associated blinking pattern. A mature state may indicate that the point has been tracked long enough to attempt to identify its blinking pattern so that the corresponding light emitting device can be classified as having been observed.

Further at block 302 of FIG. 3, once an image is received, the logic device may use the point detection module 402 of FIG. 4 to detect potential points in the image. In an aspect, the point detection module 402 may have no form of memory, but rather may evaluate each image separately as it is received. The point detection module 402 may be implemented using one or more blob detection algorithms capable of detecting image regions in a digital image that differ in properties, such as brightness or color, compared to surrounding image regions. In other words, a blob detection algorithm may be able to detect a group of connected pixels in an image that share some common property, which can be used to detect potential points in an image. As an example, point detection module 402 may be implemented using OpenCV's SimpleBlobDetector with parameters tuned for the applications described in the present disclosure such as to detect protentional points in each image. The point detection module 402 may output a list of image coordinates corresponding to potential points in an image.

The logic device may then use the point tracking module 404 to track the points between image frames. The point tracking module 404 may receive potential new points from the point detection module 402 and filter out (e.g., ignore) any points that are too close to existing points (e.g., points that have already been sufficiently identified). Any remaining points may be added as new tracked points.

The point tracking module 404 may track the points between image frames by minimizing a difference between a mathematical model (e.g., parameterized model) of a light emitting device and the detected point. For example, the mathematical model may be implemented based on the Logistic Function, and may be parameterized by the position and two shape parameters r and k. The mathematical model may be referred to herein as a Logistic Blob Kernel and may be defined as follows.

$$lb(x, y, r, k) = 1 - \frac{1}{g+1}, \quad (1)$$

$$g(x; r, k) = \exp\left(-k\left(\sqrt{x^2 + y^2} - r\right)\right)$$

Figure 7:
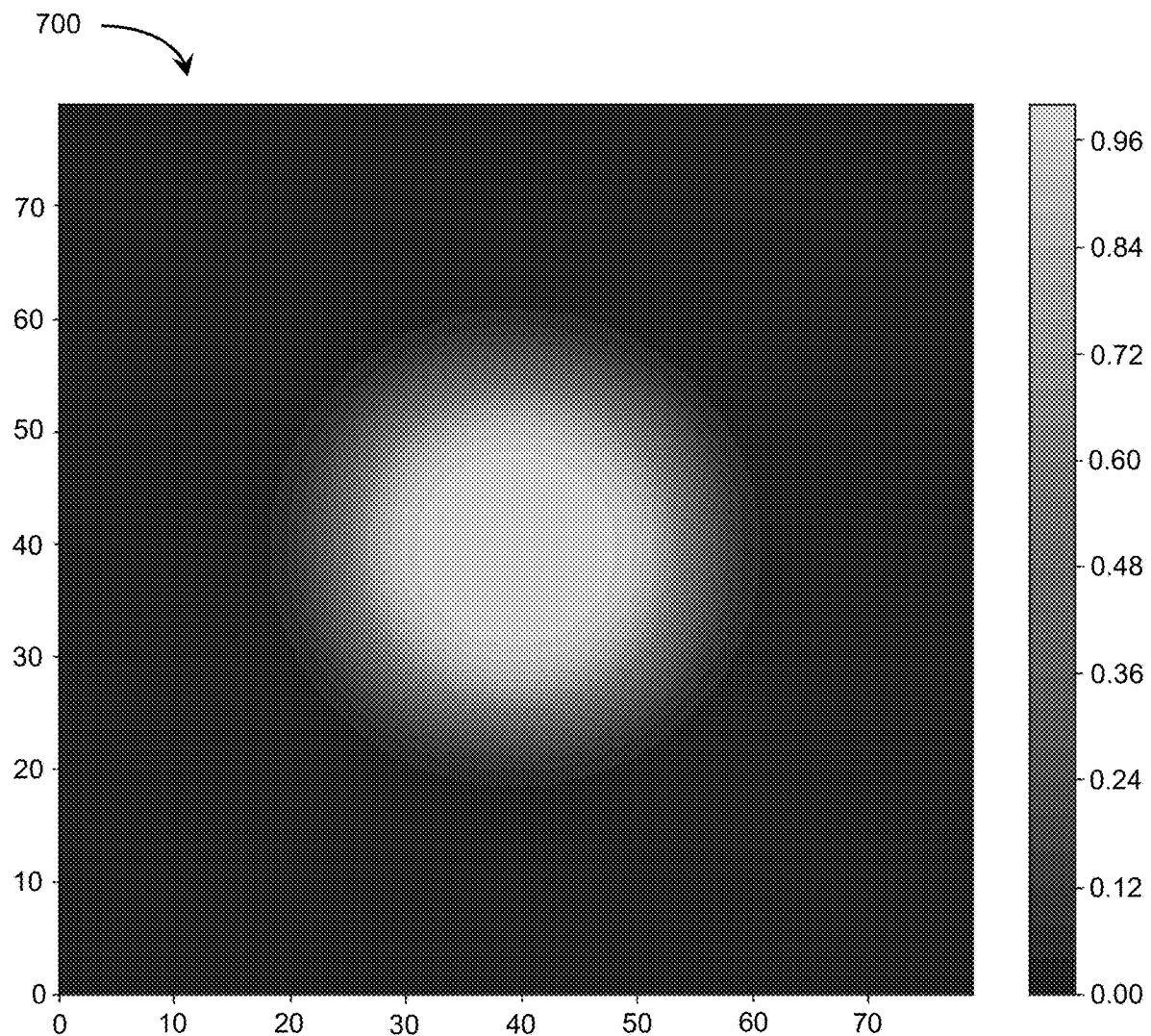
FIG. 7 illustrates an example 2D function output in accordance with one or more embodiments of the present disclosure.

In the Logistic Blob Kernel, x and y may be the coordinate positional parameters of a pixel, r may be the radius of a blob, and k may define how wide a transition is (e.g., how "steep" the transition of an edge of the blob is). As an example, FIG. 7 illustrates a 2D function output 700 provided by the Logistic Blob Kernel.

To track points across image frames received at block 302, the point tracking module 404 may perform an optimization that includes iteratively minimizing the sum of the squared pixel intensities between the mathematical model (e.g., the Logistic Blob Kernel) and the image region where a point was detected, until convergence is reached. If a final error is sufficiently small (e.g., below a predefined threshold), a tracking of a point across image frames may be considered successful. Otherwise, the tracked point may be discarded.

Each iteration in the optimization performed by the tracking module 404 may include the following steps.

Initialize: The tracking module 404 may perform an initializing step in the optimization iteration. Since the tracking module 404 may not converge if the light emitting device in the mathematical model is not touching the point in the image in a first iteration, the tracking module 404 may search for the brightest pixel in an image region around where the tracked point was in the last frame and initialize to that point.

Preprocess: The iteration performed by the tracking module 404 may further include a preprocessing step. In the preprocessing step, the tracking module 404 may compute the mean and maximum intensity value of the image, which may be used to rescale the intensity of the image, so any pixels with a value equal to or lower than the mean is set to zero, and any pixel value equal to the max intensity is set to 1.

Update kernels: The iteration performed by the tracking module 404 may further include an updating kernels step where the tracking module 404 computes the intensity values of the light emitting device mathematical model together with four gradients, based on the current value of the parameters. The four gradients of the Logistic Blob Kernel (1) may be defined as follows.

$$\frac{\partial lb}{\partial x} = -\frac{kxg}{\sqrt{x^2 + y^2} \cdot (g+1)^2} \quad (2)$$

$$\frac{\partial lb}{\partial x} = -\frac{kyg}{\sqrt{x^2 + y^2} \cdot (g+1)^2} \quad (3)$$

$$\frac{\partial lb}{\partial r} = -\frac{kg}{(g+1)^2} \quad (4)$$

$$\frac{\partial lb}{\partial x} = -\frac{\left(\sqrt{x^2 + y^2} - r\right) \cdot g}{(g+1)^2} \quad (5)$$

Compute error: The iteration performed by the tracking module 404 may further include a computer error step in which the squared error between an observed image patch for a tracked point and the Logistic Blob Kernel (1) may be computed on a per-pixel basis. For example, this may be performed by computing the difference of each pixel intensity value and squaring it.

Newton's method iteration: The iteration performed by the tracking module 404 may further include a Newton's method iteration step. In one implementation, an iteration of Newton's method may be performed using the LDLT solver from Eigen.

Update parameters: The iteration performed by the tracking module 404 may further include an updating parameters step. The tracking module 404 may update parameters of a point using the solution of the Netwon's method iteration multiplied with a step length.

Clamp parameters: The tracking module 404 may further include a clamping parameters step which includes clamping the parameter values in the updating parameters step to be within specified minimum and maximum values to avoid situations in which the optimization causes parameters to change in such a way that the optimization is no longer able to converge.

When all of the iterations of the optimization are completed, the tracking module 404 may perform one or more of the following post-optimization steps according to some embodiments.

Add parameters to history: The tracking module 404 may add the values of the parameters to RingBuffer arrays which store the last N values, where N may be selected at a compile time.

Check if points overlap: If the position of two points are too close to each other (e.g., within a threshold distance from each other), then they are probably tracking the same light emitting device. When this happens, the tracking module 404 may disable the youngest of the two points.

Check if tracking failed: If the error at the final iteration in the optimization is too high, the tracking of the point may be considered to have failed and the tracking module 404 may disable the point.

Check if point is out of bounds: If the point is too close to an edge of the image (e.g., within a threshold distance to the edge of the image), the tracking module 404 may disable the point.

Mature point: If the point is an immature point, but is old enough (e.g., tracked a threshold number of times across images to attempt to identify its blinking pattern), the tracking module 404 may change the status of the point to a mature point. Any infant points (e.g., previously created points) may have their status changed to an immature point (e.g., the point has been tracked over at least two frames, but not enough frames to identify its blinking pattern).

Referring back to FIG. 3, at block 304, the logic device may detect a blinking pattern for each of the points in the images received at block 302 and tracked across image frames. In various embodiments, the logic device may use point identification module 406 of FIG. 4 in detecting the blinking patterns. The point identification module 406 may facilitate identifying which point tracked in an image corresponds to which light emitting device of light emitting devices 504a-504e associated with the target location 502. Identifying which point tracked in an image corresponds to which light emitting device of light emitting devices 504a-504e associated with the target location 502 serves several purposes. First, this allows avoidance of trying to fit the mathematical model to points that are false positives for light emitting device, for example, such as when a point is an unrelated random light source or belongs to a different target location or UAV than the target location 502 where the mobile platform 110 is intended to align and/or land. Second, this allows for camera pose optimization to be directly solved without testing a large number of possible correspondences. The number of possible correspondences may grow with the factorial of the number of points and therefore may quickly become intractable.

Identifying which tracked point corresponds to which light emitting device 504a-504e is facilitated by having each of the light emitting devices 504a-504e blink a unique pattern (e.g., a 16-bit pattern). In a blinking pattern, a light emitting device may switch between a high brightness and a low brightness, or maintain a low brightness or high brightness, to provide a bitwise sequence representing the blinking pattern in some embodiments.

For example, each blinking pattern may have a minimum intensity level corresponding to the low brightness in its pattern that is still visible to the image sensor (e.g., imaging module 142) of the mobile platform 110, so that the point tracking module 404 does not lose track of the light emitting device. The change in intensity in the blinking pattern from low brightness to high brightness, and vice versa, may cause a halo of the light emitting device's light to change radius across the images captured by the imaging module 142.

A light emitting device's identification number may be a number assigned to a light emitting device. The number may correspond to the blinking pattern of the light emitting device. The number assigned to a light emitting device to blink should be selected carefully (e.g., not randomly) so that the blinking pattern (and thereby the identification numbers of the light emitting devices) can be distinguished from other light emitting device's blinking patterns. In one embodiment, the identification numbers for the light emitting devices 504a-504e are selected such that no two identification numbers have a Hamming distance shorter than a threshold number (e.g., a Hamming distance of 4). In other words, the blinking patterns may differ from each other by a minimum number of positions in its series of bits. In some cases, the minimum Hamming distance may be a minimum rotated hamming distance between each pattern that is sufficiently high to avoid mistaking one light emitting device from another. For example, the minimum rotated hamming distance may be the minimum hamming distance given free rotation of one of the values in a bit series, where a rotation of a value includes moving the left most value to the right most position or vice-versa any number of times.

To detect a blinking pattern, the point identification module 406 may use the derivative of the radius of a point with respect to time (e.g., a radius gradient with respect to time) rather than using the radius over time directly. Using the derivative of the radius with respect to time helps compensate for the apparent radius of a light emitting device in the image not always being dependent on its intensity alone. For example, there are effects that may alter the apparent radius of a light emitting device in the images over time, such as a distance of the light emitting device from the image sensor (e.g., camera, imaging module 142), a viewing angle of the image sensor in relation to the light emitting device orientation, and the intensity of the light emitting device. As the first two aforementioned effects are slow to change in comparison to the intensity of the light emitting device, the first two effects may be filtered out by examining the numerical derivative of the radius over time (e.g., radius gradient over time) instead of the radius directly. In this regard, the point identification module 406 may effectively perform a high-pass filtering on the radius, thereby removing the slow changing effects from the movement of the imaging system 140 and maintaining the fast-changing effects from the blinking.

The logic device, using the point identification module 406, may reconstruct a blinking pattern from the radius gradient with respect to time by iterating through the radius gradient (e.g., the stored history of the radius gradient across the images) from oldest to newest, keeping track of a current value. For example, when the point identification module 406 gets to a positive radius gradient as it moves through the stored history of radius gradients, it changes the current value to 1. If the point identification module 406 gets to a negative radius gradient, it changes the current value to 0. If the point identification 406 gets to a radius gradient of zero, it keeps the current value.

Figure 8:
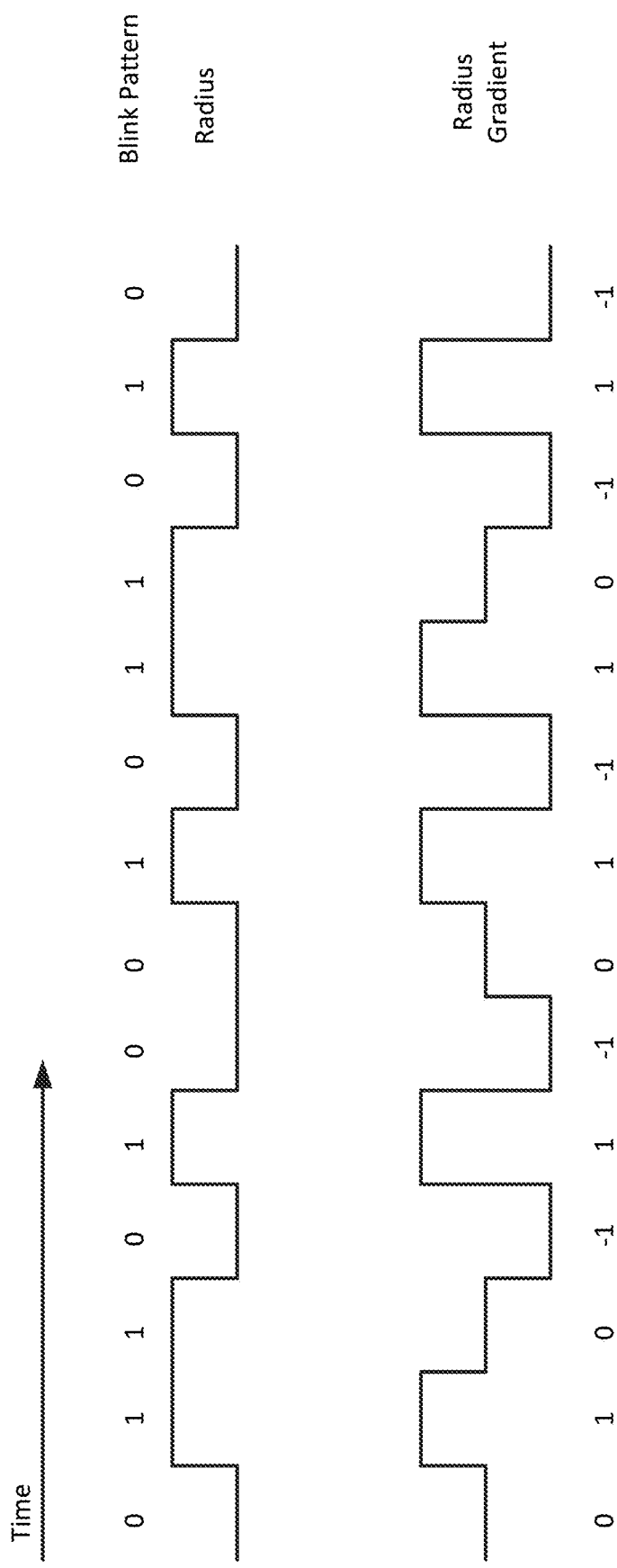
FIG. 8 illustrates an example radius gradient history used in detecting a blinking pattern associated with a light emitting device in accordance with one or more embodiments of the present disclosure.

For example, as illustrated in FIG. 8, a positive radius gradient may indicate that a light emitting device has switched to a high intensity, while a negative radius gradient may indicate that the light emitting device has switched to a low intensity. A zero radius gradient may indicate that the light emitting device is in the same state. To resolve the issue of potentially not knowing the state of the light emitting device if the first radius gradient value encountered is a zero radius gradient, one value for the prior state may be assumed, and the logic device can iterate through two blinking sequences. Then the reconstructed signal from the last sequence may be used, by which time a negative or positive radius gradient prior to the first-encountered zero radius gradient will have been reached and the issue of not knowing the state prior to the first-encountered zero radius gradient will be corrected.

In some cases, there may be a situation where the imaging system 140 (e.g., imaging module 142) and the blinking pattern of the light emitting devices 504a-504e are not synchronized or running at the same frequency. In such situations, the imaging system (e.g., the imaging module 142) may be configured to capture images at a framerate frequency that is at least twice a frequency of the blinking patterns. In one aspect, the framerate frequency may be approximately a multiple of the blinking pattern frequency (e.g., a multiple of 2 or 3).

Figure 9:
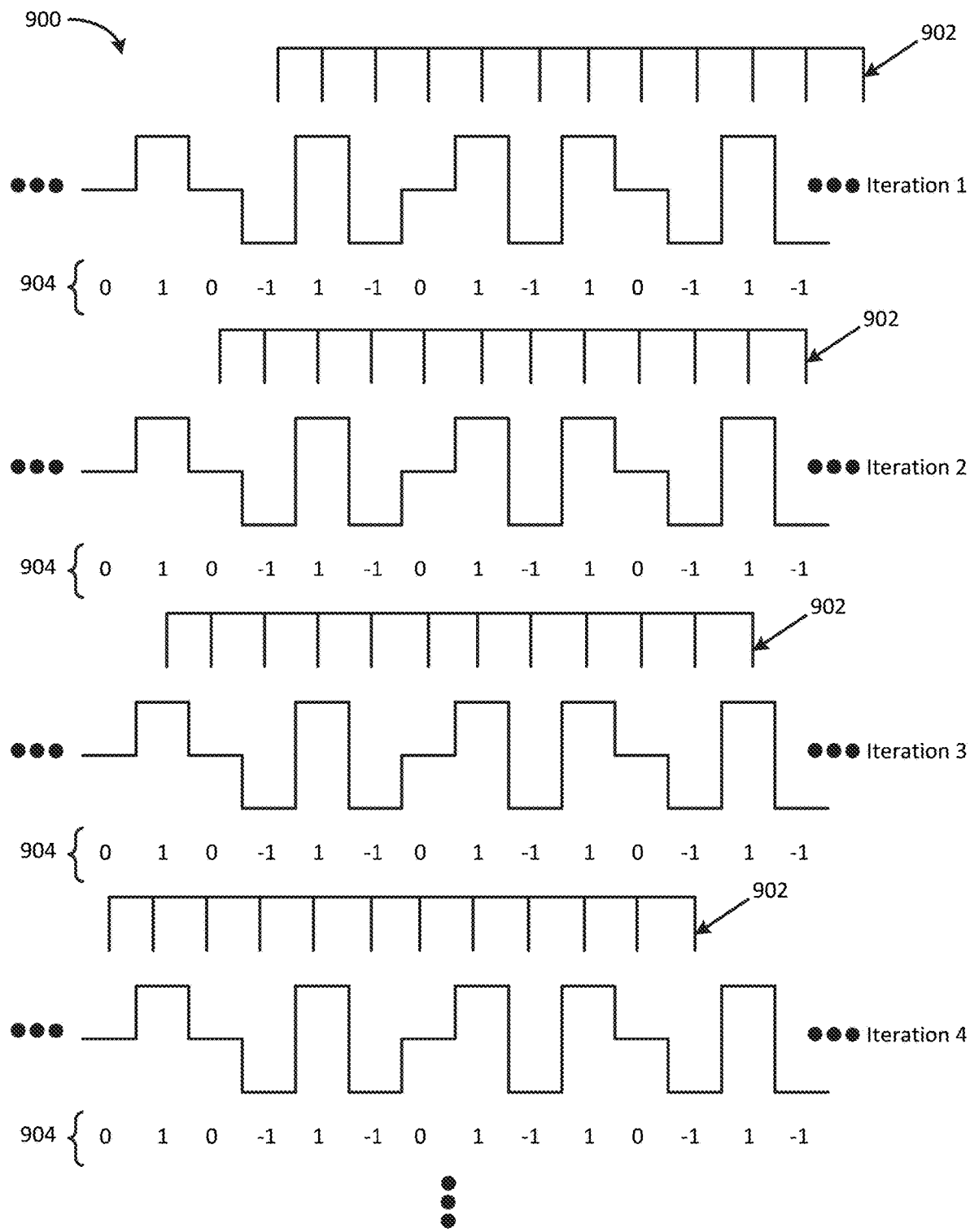
FIG. 9 illustrates a sliding window operation over a radius gradient history used in detecting blinking patterns in accordance with one or more embodiments of the present disclosure.

In some embodiments, point identification module 406 may detect the blinking pattern by identifying sequences based on the radius gradient history and comparing the identified sequences to predefined sequences corresponding to the light emitting devices 504a-504e associate with the target location 502. For example, as shown in FIG. 9, the point identification module 406 may scan through a history 904 of radius gradients with a sliding window 902 moving through the history 904 in an iterative process 900. In the iterative process 900, the point identification module 406 may identify all possible bit sequences (e.g., bit series, synchronizations) within a certain resolution. In other words, a bit sequence (e.g., the reconstructed blink pattern) may be identified for each window 902, as it is slid across the radius gradient history 904 for a tracked point. The point identification module 406 may then compare these identified sequences to the predefined sequences (e.g., light emitting device identification numbers, blinking patterns) corresponding to the light emitting devices 504a-504e associated with target location 502. In other words, the reconstructed blink pattern may be compared against the known blink patterns of light emitting devices 504a-504e to determine if there is a match.

At block 306 of FIG. 3, if point identification module 406 determines that one of the identified sequences matches one of the light emitting device identification numbers, the tracked point may be classified as an observation of the light emitting device that corresponds to the matched light emitting device identification number and an observation count for that point with respect to the matched light emitting device may be increased. In some embodiments, a match between an identified sequence and a light emitting device identification number may be determined by computing a Hamming distance between the identified sequence and the light emitting device identification number and determining that the Hamming distance is sufficiently low by comparing the computed Hamming distance to a Hamming distance threshold (e.g., below a max Hamming distance such as 1 may indicate that the identified sequence is sufficiently similar to a light emitting device identification number to be considered a match). As the Hamming distance is based on the minimum distance when, for example, a 16-bit sequence is rotated freely, the point may be observed at any time in the 16-bit sequence and not just the end. In this regard, for purposes of understanding the disclosure, it may be better to think of the 16-bit sequence as a ring of 16 bits rather than having a beginning or an end. It will be appreciated that a blinking pattern and light emitting device identification number may be shorter or longer than 16 bits, and 16 bits is used for explanatory purposes herein.

At block 308, the logic device may align the mobile platform 110 with the target location 502 based on the points that have been classified as observed light emitting devices. For example, at block 308, the logic device may use the pose optimization module 408 of FIG. 4 to evaluate each of the classified points against a heuristic to determine if the classified point has been identified with sufficient probability. The heuristic for when the probability is considered sufficient may be that there has been sufficient observation of a certain light emitting device identification number match when comparing the identified sequences for the tracked point in relation to other light emitting device identification number observations for the point. In other words, the pose optimization module 408 may determine that there has been a match of an identified sequence for a tracked point to a certain light emitting device identification number sufficiently more times than there has been a match of an identified sequence for the tracked point to any other light emitting identification number. The pose optimization module 408 may select each of the tracked points that pass the heuristic (e.g., meet or exceed a threshold) and create a list of 2D and 3D points for the tracked points. The 2D points may be the location in the image that the point was observed, and the 3D point may be calibrated from the target location 502.

The pose optimization module 408 may use a point warping function, which, given a camera pose of the mobile platform 110, projects a 3D point into a 2D point in the image. Given the correct camera pose, the 2D position outputted from projecting the 3D points through the point warping function should be very close to the observed 2D point of the tracked point.

The point warping function, w, may defined as the following function (6).

$$w(x,\xi)=\pi(d(h(g(p,\xi))))\qquad(6)$$

The g function in the function (6) transforms the 2D point p from world space to camera space, given a pose $\xi$ ("xi"), and is defined as the following function (7).

$$g(p,\xi)=R\cdot p+t\qquad(7)$$

In the g function (7), R and t are the rotation and translation of the transformed point parameterized with xi. A Jacobian with respect to xi is given by the following Jacobian (8).

$$\frac{\partial g}{\partial \xi} = \begin{bmatrix} 1 & 0 & 0 & 0 & z & -y \\ 0 & 1 & 0 & -z & 0 & x \\ 0 & 0 & 1 & y & -x & 0 \end{bmatrix} \tag{8}$$

The h function in function (6) dehomogenizes the point and may be defined by the following function (9).

$$h(p) = \begin{bmatrix} \frac{x}{z} \\ \frac{y}{z} \end{bmatrix}, p = \begin{bmatrix} x \\ y \\ z \end{bmatrix} \tag{9}$$

The h function (9) may have the following Jacobian (10).

$$\frac{\partial h}{\partial p} = \begin{bmatrix} \frac{1}{z} & 0 & -\frac{x}{z^2} \\ 0 & \frac{1}{z} & -\frac{y}{z^2} \end{bmatrix} \tag{10}$$

The d function in function (6) undistorts the point and may be defined as the following function (11).

$$d(p) = \begin{bmatrix} x(1 + k_1 r^2 + k_2 r^4 + k_3 r^6) + 2p_1 xy + p_2(r^2 + 2x^2) \\ y(1 + k_1 r^2 + k_2 r^4 + k_3 r^6) + p_1(r^2 + 2y^2) + 2p_2 xy \end{bmatrix}, \tag{11}$$

$$p = \begin{bmatrix} x \\ y \end{bmatrix}$$

The d function (11) may have the following Jacobian (12).

$$\frac{\partial d}{\partial p} = \tag{12}$$

$$\begin{bmatrix} k_3 r^6 + k_2 r^4 + k_1 r^2 + x(6k_3 xr^4 + 4k_2 xr^2 + 2k_1 x) + 6p_2 x + 2p_1 y + 1 \\ y(6k_3 xr^4 + 4k^2 xr^2 + 2k_1 x) + 2p_1 x + 2p_2 y \end{bmatrix}$$

$$\begin{bmatrix} x(6k_3 yr^4 + 4k^2 yr^2 + 2k_1 y) + 2p_1 x + 2p_2 y \\ k_3 r^6 + k_2 r^4 + k_1 r^2 + y(6k_3 yr^4 + 4k_2 yr^2 + 2k_1 y) + 2p_2 x + 6p_1 y + 1 \end{bmatrix}$$

In function (11) and Jacobian (12), $k_1$, $k_2$, $k_3$, p1, and p2 are the calibrated parameters of the distortion and $r^2 = x^2 + y^2$.

The π function in function (6) projects the point into the image and is defined as the following function (13).

$$\pi(p) = \begin{bmatrix} xf_x + c_x \\ yf_y + c_y \end{bmatrix}, p\begin{bmatrix} x \\ y \end{bmatrix} \tag{13}$$

The π function (13) may have the following Jacobian (14).

$$\frac{\partial \pi}{\partial p} = \begin{bmatrix} f_x & 0 \\ 0 & f_y \end{bmatrix} \tag{14}$$

In the π function (13) and its Jacobian (14), $f_x$, $f_y$, $c_x$, and $c_y$ are the calibrated intrinsic parameters of the camera.

By combining Jacobians (13), (12), (10), and (8), the full Jacobian (15) below for the point warping function (6) is obtained.

$$\frac{\partial w}{\partial \xi} = \frac{\partial \pi}{\partial p} \frac{\partial d}{\partial p} \frac{\partial h}{\partial p} \frac{\partial g}{\partial \xi} \tag{15}$$

The pose optimization module 408 optimizes to find the camera pose that minimizes the 2D distance between the observed position of the light emitting devices and the 2D point of the 3D point projected into the image with said pose. In some embodiments, the optimization module 408 may solve this optimization problem using the iteratively reweighted least squares (IRLS) method with the following energy function (16).

$$E(\xi) = \Sigma h(r_i)|r_i(\xi)|_2^2,$$

$$r_i(\xi) = w(p_i, \xi) - q_i \tag{16}$$

In the energy function (16), $q_i$ is the ith observed light emitting device point, $p_i$ is the ith 3D point, w is the point warping function, and h is a huber weight.

In one embodiment, the optimization is solved iteratively using Eigen's JacobiSVD solver. Eigen's JacobiSVD can compute the eigen values of the Jocobian, which can be used to compute a Condition Number. The Condition Number may be used to evaluate the stability of the solution, for example, if all the points are on a line. The solution may be discarded if the Condition Number is too high (e.g., exceeds a threshold number).

If the error after the final iteration is too high, the tracking may be considered to have failed and a pose is not returned by pose optimization module 408. If a pose is determined, but there are one or more points with an error that is significantly higher than an average error, then this may be used as a strong indication that this point has been identified incorrectly. This may happen when the camera moves in such a way that two points overlap in the image and tracking jumps from one point to the other. In this event, observations of this point may be reset to zero, which forces the point identification module 406 to re-identify the point in further image frames before it is used in pose optimization by pose optimization module 408 again.

In some embodiments, when a solution is found, a covariance matrix may be computed. The covariance matrix may be computed using the following function (17).

$$\Sigma = (J^2 WJ)^{-1} J^T W T W^T J (J^T W^T J)^{-1} \tag{17}$$

In function (17), J is a Jacobian, W is a weight matrix, and T is the covariance matrix of the points.

The pose optimization module 408 may run through all of the points that have not yet been identified and therefore were not part of the optimization, and check if any of them fit with the pose that was found in the optimization. An observation may be added for any of the points not yet identified, if it fits with the pose found. Adding observations for points that have not been identified yet when they fit within the pose allows for quick addition of additional points once there are enough points to perform the pose optimization.

If pose optimization module 408 determines a pose, it may return the pose together with its covariance matrix. If pose optimization module 408 is not able to determine the pose, it may return an empty pose.

The pose filtering module 410 may receive the output return from pose optimization module 408. In some embodiments, the pose filtering module 410 may be an implementation of an SE(3) Extended Kalman filter that tracks both the position and velocity of the camera pose. A state vector may be defined as follows.

$$\mu = \begin{bmatrix} \xi \\ \dot{\xi} \end{bmatrix} \quad (18)$$

In the state vector (18), xi and xi dot may both be SE(3) elements, where xi dot defines a velocity in the local space of xi. As each of the SE(3) elements are six-element vectors, the full state µ is a twelve-element vector. The filter may also compute a 12×12 covariance matrix. The pose filtering module 410 provides a measurement of xi with a covariance, the value of xi dot is however fully estimated internally in the filter.

Below are variables and functions that may be implemented by the pose filtering module 410 in providing an output pose.

$\mu_t$: Estimated state at time t.
$\Sigma_t$: Estimated covariance at time t.
$\bar{\mu}T_t$: Predicted state at time t.
$\bar{\Sigma}_t$: Predicted covariance at time t.
$z_t$: Measurement at time t.
$g(\mu)$: State transition function.
$G_t$: Gradient of g at time t.
R: Covariance of the transition model noise.
$Q_t$: Covariance of the measurement noise at time t.
H: Measurement matrix.
$K_t$: The Kalman gain at time t.

Transition Function: A transition function g models the change in state from time-step to time-step. The transition function g may be defined as the following function (19).

$$g(\mu_{t-1}) = g\left( \begin{bmatrix} \xi_{t-1} \\ \dot{\xi}_{t-1} \end{bmatrix} \right) = \begin{bmatrix} \xi_{t-1} \oplus \dot{\xi}_{t-1} \\ \dot{\xi}_{t-1} \end{bmatrix} \quad (19)$$

A gradient of g of time t is defined as the following function (20).

$$G_t = \begin{bmatrix} Ad(\dot{\xi}_{t-1})^{-1} & 1 \\ 0 & 1 \end{bmatrix} \quad (20)$$

The oplus operator in equation (20) may be defined as described in "A micro Lie theory for state estimation in robotics" found at https://arxiv.org/abs/1812.01537, and Ad(xi dot)$^{-1}$ is the inverse of the adjoint of xi dot. The function (19) is integrating the velocity into the position. Thus, any change in the velocity and any deviation in the position from the model may be modeled as noise.

Extended Kalman Filter: A Kalman filter is split into a prediction step and a measurement step. When a first pose is obtained from the pose optimization module 408, the Kalman filter may be initialized and ran. In some embodiments, the prediction step and the measurement step may be ran at the same time, but if a measurement was not returned by the pose optimization module 408, then the prediction step is run without the measurement step. This allows the pose filtering module 410 to keep running even if the pose optimization module 408 fails for one or more frames. However, in some embodiments, after a certain limit of iterations that the pose filtering module 410 runs without a measurement from pose optimization module 408, uncertainty may become too high and the tracking of the light emitting devices may be considered lost.

Prediction Step: The prediction step uses a previous state of the pose filtering module 410 together with the transition function (19) to predict a current state. The computation of the prediction parameters may be defined in equations (21) and (22) below.

$$\dot{\bar{\mu}}_t = g(\mu_{t-1}) \quad (21)$$

$$\bar{\Sigma}_t = G_t \Sigma_{t-1} G_t + R \quad (22)$$

Measurement Step: The measurement step incorporates the measurement and covariance from the pose optimization module 408. Equations (23)-(25) may be used in the measurement step.

$$K_t = \bar{\Sigma}_t H^T (H \bar{\Sigma}_t H^T + Q_t)^{-1} \quad (23)=$$

$$\mu_t = \bar{\mu} \oplus K_t (z_t \ominus H \bar{\mu}_t) \quad (24)$$

$$\Sigma_t = (I - K_t H) \bar{\Sigma}_t \quad (25)$$

Again, the oplus and ominus operator may be defined as in the "A micro Lie theory for state estimation in robotics" paper.

Returned State: If only the prediction step was performed, the predicted state at time t ($\bar{\mu}_t$) and the predicted covariance at time t ($\bar{\Sigma}_t$) are used for the current state and covariance. If both the prediction step and the measurement step are performed, the estimated state at time t ($\mu_t$) and the estimated covariance at time t ($\Sigma_t$) are used as the current state and covariance.

Thus, once a sufficient number of light emitting devices 504a-e have been classified as observed, the pose optimization module 408 and the pose filtering module 410 are able to estimate the pose of the camera (e.g., imaging module 142 of imaging system 140) using the 3D to 2D point correspondences, the calibrated 3D position of the points and a lens model of the camera. Based on the pose of the camera in relation to the light emitting devices 504a-504e, the logic device may adjust the mobile platform 110 (e.g., via control signals sent to the propulsion system 124) to precisely align with target platform 502 to perform an action such as land or dock.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving images captured of a target location comprising a plurality of light emitting devices, wherein each of the light emitting devices has an associated blinking pattern;
detecting the blinking pattern for each of the light emitting devices in the images, wherein the detecting comprises determining, for each of the light emitting devices, a gradient of an associated radius in the images over time;
determining a classification for each of the light emitting devices based on its detected blinking pattern; and
aligning a mobile platform with the target location based on the classifications of the light emitting devices.

2. The method of claim 1, wherein the detecting further comprises, for each of the light emitting devices:
identifying a sequence based on the gradient of the associated radius over time; and
comparing the identified sequence to predefined sequences corresponding to the plurality of light emitting devices.

3. The method of claim 2, wherein the detecting further comprises determining a match between the identified sequence and one of the predefined sequences.

4. The method of claim 2, wherein each of the blinking patterns corresponds to an associated sequence of bit values.

5. The method of claim 4, wherein each of the blinking patterns differ from each other by a minimum number of positions in the sequence.

6. The method of claim 1, further comprising tracking positions of the light emitting devices by iteratively minimizing differences between models of the light emitting devices and corresponding representations of the light emitting devices in the images.

7. The method of claim 1, further comprising:
identifying a new light emitting device in at least one of the images that is within a threshold distance to one or more previously classified light emitting devices; and
ignoring the new light emitting device based on the threshold distance.

8. The method of claim 1, wherein the images are captured at a frame rate frequency that is at least twice a frequency of the blinking patterns.

9. The method of claim 1, wherein the mobile platform is implemented as an unmanned aerial vehicle (UAV), and wherein the method is performed by a logic device of the UAV.

10. The method of claim 1, wherein the gradient comprises a derivative of the radius over time.

11. A system comprising:
a logic device configured to:
receive images captured of a target location comprising a plurality of light emitting devices, wherein each of the light emitting devices has an associated blinking pattern;
detect the blinking pattern for each of the light emitting devices in the images, wherein the detecting comprises determining, for each of the light emitting devices, a gradient of an associated radius in the images over time;
determine a classification for each of the light emitting devices based on its detected blinking pattern; and
align a mobile platform with the target location based on the classifications of the light emitting devices.

12. The system of claim 11, wherein logic device is configured to, for each of the light emitting devices:
identify a sequence based on the gradient of the associated radius over time; and
compare the identified sequence to predefined sequences corresponding to the plurality of light emitting devices.

13. The system of claim 12, wherein the logic device is configured to determine a match between the identified sequence and one of the predefined sequences.

14. The system of claim 12, wherein each of the blinking patterns corresponds to an associated sequence of bit values.

15. The system of claim 14, wherein each the blinking patterns differ from each other by a minimum number of positions in the sequence.

16. The system of claim 11, wherein the logic device is configured to track positions of the light emitting devices by iteratively minimizing differences between models of the light emitting devices and corresponding representations of the light emitting devices in the images.

17. The system of claim 11, further comprising:
identifying a new light emitting device in at least one of the images that is within a threshold distance to one or more previously classified light emitting devices; and
ignoring the new light emitting device based on the threshold distance.

18. The system of claim 11, wherein the images are captured at a frame rate frequency that is at least twice a frequency of the blinking patterns.

19. The system of claim 11, further comprising the mobile platform implemented as an unmanned aerial vehicle (UAV), wherein the logic device is disposed on the UAV.

20. The system of claim 11, wherein the gradient comprises a derivative of the radius over time.

* * * * *

UNITED STATES PATENT AND TRADEMARK OFFICE
CERTIFICATE OF CORRECTION

Page 1 of 1

PATENT NO. : 12,332,663 B2
APPLICATION NO. : 17/847709
DATED : June 17, 2025
INVENTOR(S) : Matias Varnum Christensen It is certified that error appears in the above-identified patent and that said Letters Patent is hereby corrected as shown below:

In the Specification

In the DETAILED DESCRIPTION:

Column 14, Line 60, change "$\frac{\partial lb}{\partial x} = -\frac{kyg}{\sqrt{x^2+y^2} \cdot (g+1)^2}$" to --$\frac{\partial lb}{\partial y} = -\frac{kyg}{\sqrt{x^2+y^2} \cdot (g+1)^2}$--.

Column 14, Line 65, change "$\frac{\partial lb}{\partial x} = -\frac{(\sqrt{x^2+y^2}-r) \cdot g}{(g+1)^2}$" to --$\frac{\partial lb}{\partial k} = -\frac{(\sqrt{x^2+y^2}-r) \cdot g}{(g+1)^2}$--.

Column 20, Line 51, change "Tis the covariance matrix" to --T is the covariance matrix--.

Column 21, Line 24, change "$\bar{\mu}T_t$: Predicted state at time $t$." to --$\bar{\mu}_t$: Predicted state at time $t$.--.

Signed and Sealed this
Twenty-ninth Day of July, 2025

Coke Morgan Stewart
*Acting Director of the United States Patent and Trademark Office*